United States Patent [19]

West et al.

[11] 4,023,006
[45] May 10, 1977

[54] PLASMA ARC WELDING METHOD

[75] Inventors: Richard West; Donald Leslie Amos Weston, both of Bristol, England

[73] Assignee: Rolls-Royce (1971) Limited, England

[22] Filed: Dec. 16, 1974

[21] Appl. No.: 533,174

Related U.S. Application Data

[62] Division of Ser. No. 303,767, Nov. 6, 1974, abandoned.

[30] Foreign Application Priority Data

Nov. 6, 1971 United Kingdom ............. 51659/71

[52] U.S. Cl. .......................... 219/121 P; 219/74; 219/137 R; 315/111
[51] Int. Cl.² ................. B23K 9/16; B23K 9/10; H01J 7/24
[58] Field of Search ............ 219/121 P, 74, 75, 76, 219/136, 137, 130; 313/231; 315/111

[56] References Cited

UNITED STATES PATENTS

| 3,102,948 | 9/1963 | McCampbell et al. ............ 219/137 |
| 3,246,115 | 4/1966 | Johnson ........................ 219/121 P |
| 3,312,566 | 4/1967 | Winzeler et al. ........... 219/121 P X |
| 3,324,277 | 6/1967 | Herring, Jr. ................ 219/121 P X |
| 3,432,637 | 3/1969 | Witting .............................. 219/74 |
| 3,573,420 | 4/1971 | Johnson .............................. 219/76 |
| 3,602,683 | 8/1971 | Hishida et al. .................. 219/121 P |
| 3,621,177 | 11/1971 | McPherson et al. ................. 219/61 |
| 3,627,978 | 12/1971 | Endo et al. ........................ 219/74 X |
| 3,736,403 | 5/1973 | Rogers et al. ................... 219/74 X |

FOREIGN PATENTS OR APPLICATIONS

1,180,942  2/1970  United Kingdom ............... 315/111
845,410  8/1960  United Kingdom ............... 315/111

*Primary Examiner*—A. Bartis
*Attorney, Agent, or Firm*—Stevens, Davis, Miller & Mosher

[57] ABSTRACT

A method of operating a plasma welding apparatus producing a plasma arc and having valve means arranged to control gas flow for the plasma arc and power supply means arranged to control welding current for the plasma arc, wherein the plasma arc current, gas flow to the plasma arc and the feed of a filler material to the arc are coordinated for producing a weld. The gas flow and welding current are maintained at a steady rate during the weld run. The gas flow is reduced at a constant rate to a minimum valve of about 30 % of the steady flow rate at the conclusion of the welding run and the welding current is subsequently reduced at a constant rate from the steady value of the welding current. At the start of the weld run, the gas flow is initiated at a rate of about 50 % of the steady flow rate, the plasma arc current is initiated and is increased at a constant rate to the steady value from an initial value sufficient to strike the arc and the gas flow is increased at a constant flow rate to the steady flow rate as soon as the plasma arc has established a keyhole. The feed of filler material is at a constant rate and is initiated immediately before the plasma arc has established the keyhole and continued until the welding current decreases by substantially 20 % from its steady value.

8 Claims, 3 Drawing Figures

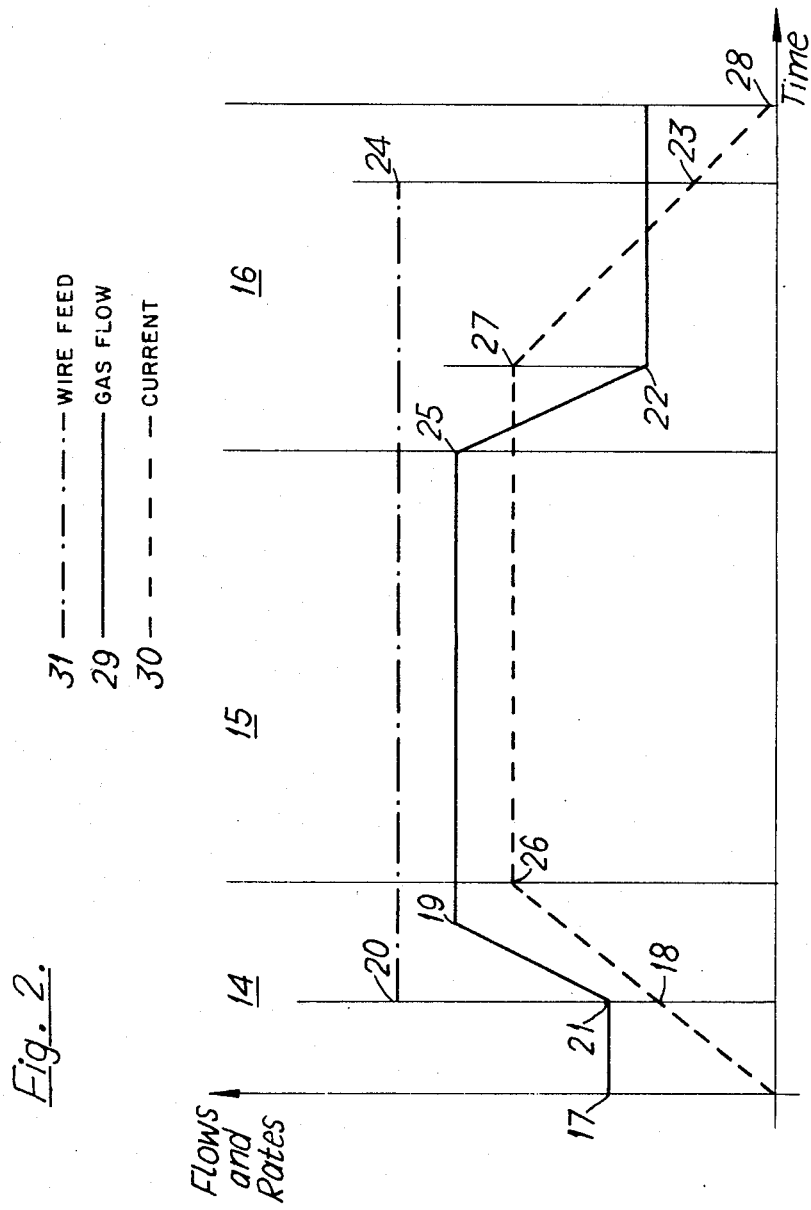

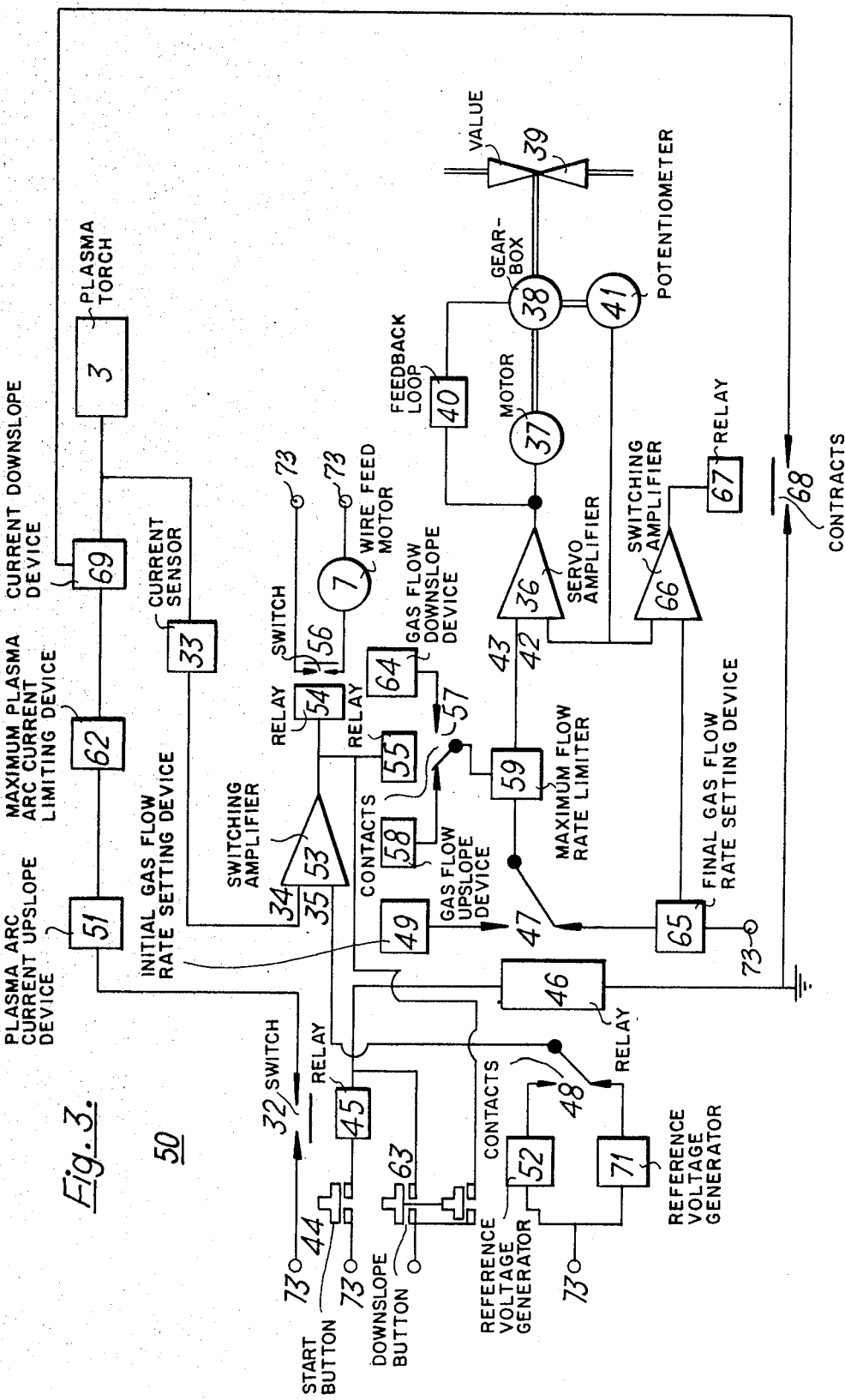

PLASMA ARC WELDING METHOD

This is a division of application Ser. No. 303,767, filed Nov. 6, 1974 and now abandoned.

This invention relates to improvements in plasma welding.

Plasma welding is commonly performed by the keyhole technique. This entails traversing a molten bead along a desired weld line such that the bead is formed by melting material in front of the plasma are which then flows around the side of the arc and solidifies behind the arc, the molten bead being similar in appearance to a keyhole. The execution of a good quality weld depends on successful correlation of several variable parameters of the welding operation namely the gas flow to the torch, the current supply to the plasma arc, the feed rate of the filler material and the traverse of the arc across the material to be welded.

According to this invention there is provided plasma welding apparatus comprising a valve, means for adjusting said valve to produce a gas flow having sequentially a constant rate of increase, a steady flow and a constant rate of decrease and means to coordinate the gas flow with required changes in welding current.

Also according to this invention there is provided plasma welding apparatus comprising means for coordinating the feed of a filler material with required changes in welding current.

Preferably the feed of filler material is at a constant rate and is initiated immediately before the welding current has attained a value corresponding to a keyhole being established and is continued until the welding current has decreased by substantially twenty per cent from its steady value.

Preferably the welding process is initiated by starting the gas flow at a rate substantially equal to fifty per cent of the steady flow rate.

The welding current may be initiated substantially simultaneously with the gas flow.

It is desirable at the end of the weld for the gas flow rate to be decreased to its minimum value substantially before commencing to decrease the welding current from its steady value.

A particular embodiment of the invention will now be described by way of example only with reference to the accompanying drawings wherein:

FIG. 2 shows a typical relationship, in accordance with the invention, between the rate of gas flow for the plasma arc, the current supplied to the torch and the filler material feed rate.

FIG. 3 is a block diagram of an apparatus suitable for producing the relationship of the graph of FIG. 2.

Figure 1:
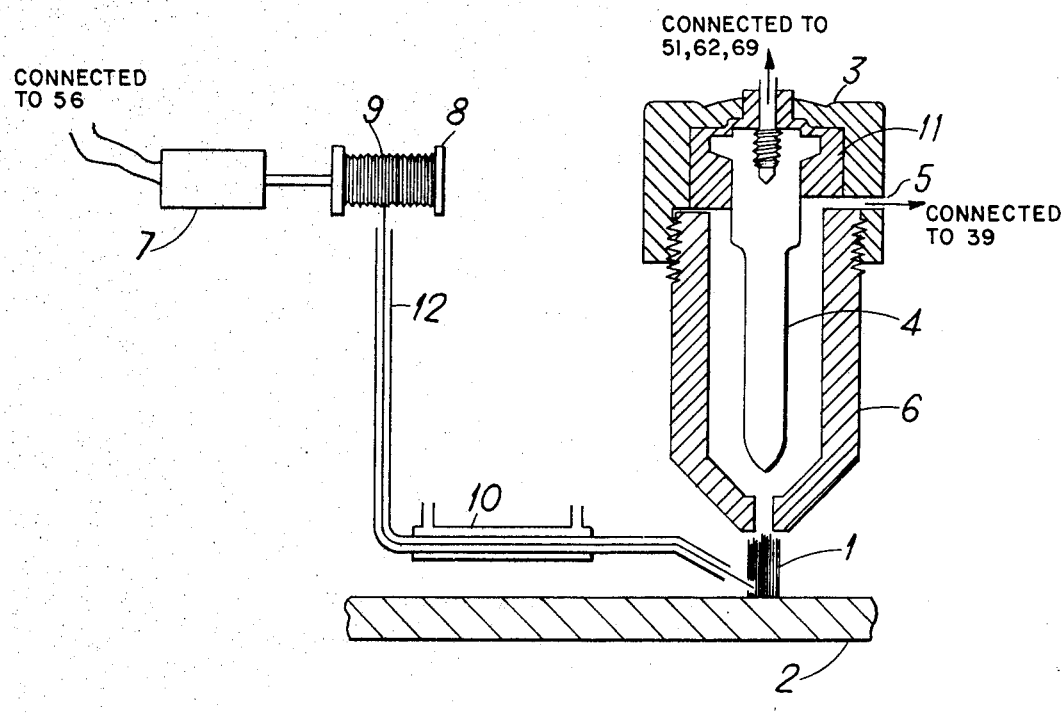
FIG. 1 is a schematic diagram of the layout of a plasma welding apparatus.

In FIG. 1 a plasma arc 1 is directed towards a workpiece 2 from the plasma welding nozzle 3 forming the plasma arc 1. The nozzle 3 comprises a central electrode 4, usually made of tungsten and isolated from the main body of the nozzle 3 by insulation 11, an inlet 5 for an inert gas usually argon, and a shield 6 which restricts the width of the plasma arc 1.

A motor 7 drives a spool 8 round which is wound with a filler material in wire form 9 suitable for the materials being welded. The wire is cooled by a heat exchanger 10, water being a convenient exchange medium.

The welding process is protected by a local atmosphere of an inert gas to prevent oxidation.

The work 2 is traversed relative to the nozzle 3 and the wire feed attachment 12, alternatively the nozzle and the wire feed attachment can be moved along the desired weld line.

A good plasma weld is required to have a smooth progressive lead in, an even constant weld along the workpiece and a gradual even fade out at the finish of the weld. This is particularly important when joining for example two cylinders by a circumferential butt weld as it is necessary to overlap the beginning and end of the welding run and the sensitivity of the welding technique is such that an uneven lead in to the weld will prevent a regular consistent weld being effected at the overlap.

The graph of FIG. 2 shows a typical relationship between the rate of gas flow for the plasma arc, the current supplied to the torch and the wire feed attachment, such as may be produced using the apparatus described with reference to FIG. 3.

The gas flow for the plasma arc is represented by the solid line (29) a suitable current flow is indicated by a hatched line (30) and the wire feed is shown as a chain dotted line, (31).

The regions (14,16) are referred to as upslope and downslope respectively, region (15) represents the steady rate welding process.

An operator begins the welding cycle by starting the gas flow the initial value of which (17) is commonly set at 50% of the maximum value required during the welding operation. The current upslope then begins, the current increasing at a substantially constant rate and when it reaches a predetermined value 18 the gas flow also begins to increase at a substantially constant rate. At the same time the wire feed motor is switched on at 20 and the wire feed continued at a constant rate until the current has decreased to point 23 on the graph. Points 20 and 23 represent respectively the values of welding current that correspond to the establishing of a keyhole, and the time at which the welding current has decreased to substantially twenty percent of steady value. The current reaches its maximum value at 26 and remains at a steady value until point 27. The rate of increase of the gas flow rate is controlled by setting the time required for the gas flow rate to reach its maximum value and this is chosen according to the material to be welded and its physical dimensions.

In practice the rate of increase of gas flow is not found to be critical and is generally achieved over a time period of one second. This defines the point 19. The point 19 may lie to the right or left of the point 26 at which the welding current has achieved its steady value.

The parameters selected for the upslope region determine the characteristics of the lead in to the weld. The weld is not started at full welding current as this is found to cause a large mound of material to be left at the start position. To eliminate this mound it is desirable that the gas flow rate should exceed one cubic foot per hour to enable a stable arc to be established. The traverse of the welding torch which is carried out at a steady rate throughout the process must begin before a large weld pool is formed and the commencement of the gas upslope should be delayed until the welding current has reached the welding level, i.e. the point 18 at which a keyhole is established. The welding current although illustrated as starting from zero can in practice be started at about thirty per cent of its steady state value; indeed this is desirable to strike the arc. A high frequency current may be used to initiate the arc as in conventional welding processes.

As is conventional in plasma welding the work, the torch and the underneath of the work are shielded by an inert gas such as argon.

This shielding is applied before welding commences to purge the local atmosphere, and is continued after the welding process has stopped until the temperature of the work has dropped sufficiently to prevent oxidation of the weld and other undesirable interactions between the metal and atmospheric gases. It has been found that a good fade out is achieved if the gas flow rate is reduced to its minimum value substantially before the welding current starts to decrease. Just before the conclusion of the welding run 25 the operator initiates the reduction in gas flow, for which a final value of some 30% of the maximum gas flow rate is chosen, together with the time taken for it to reach this value. At the time 27 when the gas flow rate has been reduced to its minimum at point 22 the current begins to decrease, and the wire feed motor stops at the same point in time 24 as the current reaches its value at 23.

A small decrease in welding current of the order of ten per cent is permissable before the gas flow rate has decreased to its minimum value.

The current is illustrated in FIG. 2 as falling steadily away to zero. This may be possible but conventional welding power supplies will generally not continue to operate below a certain current; this is not detrimental to the execution of the weld providing the welding current is reduced to below about fifty per cent of its steady value.

It has been found that by maintaining the welding current at its steady level and reducing the gas flow rate the fluidity of the weld bead may be maintained and the keyhole closed. Downslope rates for both current and gas flow were selected which were slow enough both to prevent cracking of the weld due to rapid shrinkage of the weld pool and to allow the keyhole time to fill without producing a concave top bead surface.

The gas downslope rate must be fast enough to prevent gas being trapped beneath the shrinking weld pool.

The final gas flow rate should be reduced to the level of less than 0.75 cubic feet per hour in order to reduce the plasma force and to prevent cratering at the end of the weld. But a sufficient flow should remain to sustain an arc. A typical set of values used in executing a circumferential plasma butt weld according to the invention in the high temperature resistant nickel alloy in Waspaloy (Registered Trade Mark) are:

Weld executed in 12 gauge Waspaloy (Registered Trade Mark)
| | |
|---|---|
| Plasma Welding Nozzle Size | 1/16 inch |
| Plasma Arc Voltage | 29 volts |
| Plasma Arc Welding Current | |
| Starting | 35 amperes |
| Welding | 80 amperes |
| Final | 29 amperes |
| Time from Starting to Welding value | 2 seconds |
| Time from Welding to Final value | 5 seconds |
| Gas Flow Rate | |
| Starting | 1.00 cubic feet per hour |
| Steady | 1.50 cubic feet per hour |
| Final | 0.75 cubic feet per hour |
| Time from Starting to Steady value | 1 second |
| Time from Steady to Final Value | 1 second |
| Welding traversing speed | 15 inches/minute |
| Wire feed rate 20 gauge wire | 28 inches/minute |

The gas flow regulating means now described and illustrated in FIG. 3 is intended for use with any plasma welding power supply to regulate the gas flow in accordance with the invention.

The regulation of the gas flow is controlled by a servo amplifier 36 the output of which powers an electric motor 37 which via a gearbox 38 varies the gas flow rate through a valve 39.

The position of the valve 39, which determines the gas flow, is relayed to the servo amplifier 36 via a feedback loop comprising a potentiometer 41 driven by the gearbox 38 and connected into the inverting input 42 of the servo amplifier 36. In this way the amplifier 36 subtracts the actual position of the valve 39 from the desired position which is represented by the signal at the noninverting input 43 and the resulting output from the amplifier 36 is the signal to the motor 37 to adjust the position of the valve 39. In order to prevent the motor from overrunning it is damped by a feedback from the gearbox 38. This feedback loop 40 is triggered by a layshaft (not shown) in the gearbox 38.

The operating signal to the amplifier 36 is derived from a series of interconnected circuits. As will be explained in detail the interconnection is aimed at producing a gas flow having the profile illustrated in FIG. 2 and coordinating said gas flow with the wire feed and the current supply to the welding torch.

The relationship between the integers of the block diagram of FIG. 3 will now be explained with reference to a typical plasma welding run.

A welding run is begun by an operator pressing the start button 44. This connects a relay 45 which energizes a second relay 46 to close two pairs of contacts 47, 48. The first pair of contacts 47 switches in the apparatus in block 49 to send a signal to the servo amplifier 36 which via the motor 37 and the gearbox 38 starts the gas flow at a rate dictated by said signal. This is a preset value chosen by the operator having regard to the physical characteristics of the material to be welded and is commonly chosen to be 50, of the maximum gas flow rate required during the welding process.

Relay 45 also operates switch 32 to initiate the electrical supply to the plasma torch 3. The strength of the plasma are current is increased at a constant predetermined rate from the value necessary to ensure a steady strike of the plasma welding arc. This may be an inbuilt function of the plasma welding power supply or it may be a separate unit within this device. It is illustrated as block 51. The apparatus in blocks 62 and 69 has no effect on the initial current supply to the torch 3, and its significance will be explained later. The second pair of contacts 48 connects a reference voltage derived from the electronics of block 52 (which is referred to as the upslope current trip) to one terminal 35 of a switching amplifier 53. When the arc current reaches a predetermined strength as sensed by the electronics of block 33 (point 18 of FIG. 1) the signal appearing at terminal 34 of the switching amplifier 53 equals the reference voltage at terminal 35, and then the switching amplifier energizes relays 54 and 55.

Relay 54 connects terminals 56 to bring the wire feed motor 7 into operation. The wire feed rate can be varied and a suitable value is chosen by the operator before starting the welding run.

Relay 55 switches the contacts 57 to bring the gas flow upslope rate, block 58, into operation. The rate of gas flow will now steadily increase until it reaches the maximum value, set in terms of the maximum output from block 59 to terminal 43 of the amplifier 36. Block 59 provides the maximum limit for the gas flow rate and may be preset before commencing the welding run.

The electronics in block 58 is designed so that the time for the gas flow rate to increase from the value set by block 49 ( the starting gas flow) to the maximum rate determined by block 59 can be chosen. This determines the slope of the line between points 21 and 19 of FIG. 2.

The maximum plasma are current is limited by the apparatus in block 62 and this may be a feature of the plasma are welding supply or another unit within this device.

The welding proceeds with the values of the wire feed, gas flow and arc current at steady values until at point 25 the operator decides to terminate the welding run, which is done by pressing the downslope button 63; alternatively a time switch (not shown) may be used to initiate the downslope.

Pressing the downslope button cuts off the current to relays 46 and 55. Contacts 47, 48, 57 change over and the gas flow rate starts to decrease, the rate of decrease being controlled by block 64. The time for the gas flow rate to change from the maximum flow rate to the final gas flow rate, can be altered to vary the slope of the line 25, 22 of FIG. 2.

The feedback from the potentiometer 41 is compared with the signal from block 65, representing the final gas flow rate, by the switching amplifier 66.

When the two values are equal the switching amplifier 66 energizes relay 67. This closes contacts 68 and sends an instruction to block 69 to start the current downslope. The current decreases at a predetermined rate which may, once more, be a function of the plasma welding power supply or of the unit. When the current has decreased to a value such that the voltage at terminal 34 of the switching amplifier equals the new reference voltage set by block 71, the downslope current trip, the switching amplifier 53 switches off, releases relay 55 and stops the wire feed motor 7.

The plasma arc welding current continues to decrease until it reaches either zero or the lower limit available from the power supply but preferably this lower limit should not be greater than fifty per cent of the steady plasma arc welding current.

The equipment can be fitted with a reset button (not shown) to make the apparatus ready for a second run. The reset button would return all two way switches to a null position (i.e. not contacting either of the two output connections of the switches) and also disconnect all one way switches.

The traverse of the workpiece below the plasma arc may be controlled manually or by switches built in the apparatus of FIG. 3. For example the traverse may be initiated by the switch 44 and terminated by a time switch set to switch off at a suitable time interval (ten seconds) after the end of the welding process. This time interval is not critical.

Appropriate power supplies are supplied to the apparatus of FIG. 3 via terminals 73.

It will be appreciated that, while the regulation of the gas flow has been described in terms of correlation with the plasma arc welding current; once the interelationship between the current and gas flows has been understood it would be quite possible to regulate the current in terms of the gas flow at a given time.

Indeed once the time intervals and slopes are known it is possible to regulate any one parameter of the invention by correlating it with any other parameter.

For welding very thick materials it is not practicable to use the keyhole technique and several welding runs are required to be made by the process known as overlap welding. This process may also be carried out using the apparatus described in the invention using the techniques herein described with respect to the upslope and downslope regions.

That we claim is:

1. A method of operating a plasma welding apparatus producing a plasma arc and having valve means arranged to control gas flow for the plasma arc, and power supply means arranged to control welding current for the plasma arc, comprising the steps of: providing a steady gas flow rate and welding current at a steady value during a welding run; reducing the gas flow rate, at a substantially constant rate, to a minimum value of the order of 30% of the steady flow rate at the conclusion of the welding run; and substantially subsequently reducing the plasma arc welding current, at a constant rate, from the steady value of welding current.

2. A method of operating a plasma welding apparatus according to claim 1, the method further comprising the steps of: setting, at the start of the welding run, the gas flow rate at an initial value of the order of fifty per cent of the steady flow gas rate during the welding run; increasing the plasma arc welding current at a substantially constant rate to the steady value from an initial value sufficient to strike the plasma arc; and increasing the gas flow rate to the steady flow gas rate, at a substantially constant rate, as soon as the plasma arc has established a heyhole.

3. A method of operating a plasma welding apparatus according to claim 2, further having a means for feeding filler material to a weld, further comprising the step of: commencing the feed of filler material to the weld substantially as the keyhole is established.

4. A method of operating a plasma welding apparatus according to claim 1, further having a means for feeding a filler material to a weld, further comprising the step of: stopping the feed of filler material to the weld when the plasma arc welding current has been reduced to substantially 20% of the steady value of welding current.

5. A method of operating a plasma welding apparatus according to claim 1 wherein the minimum value of the gas flow rate is sufficient to sustain an arc.

6. A method of operating a plasma welding apparatus according to claim 5, wherein the minimum value of the gas flow rate is less than 0.75 cubic feet per hour.

7. A method of operating a plasma welding apparatus according to claim 5 wherein the welding current is reduced to zero.

8. A method of operating a plasma welding apparatus according to claim 5 wherein the welding current is reduced to a limit not greater than fifty per cent of the steady value of welding current.

* * * * *